Figure 1:
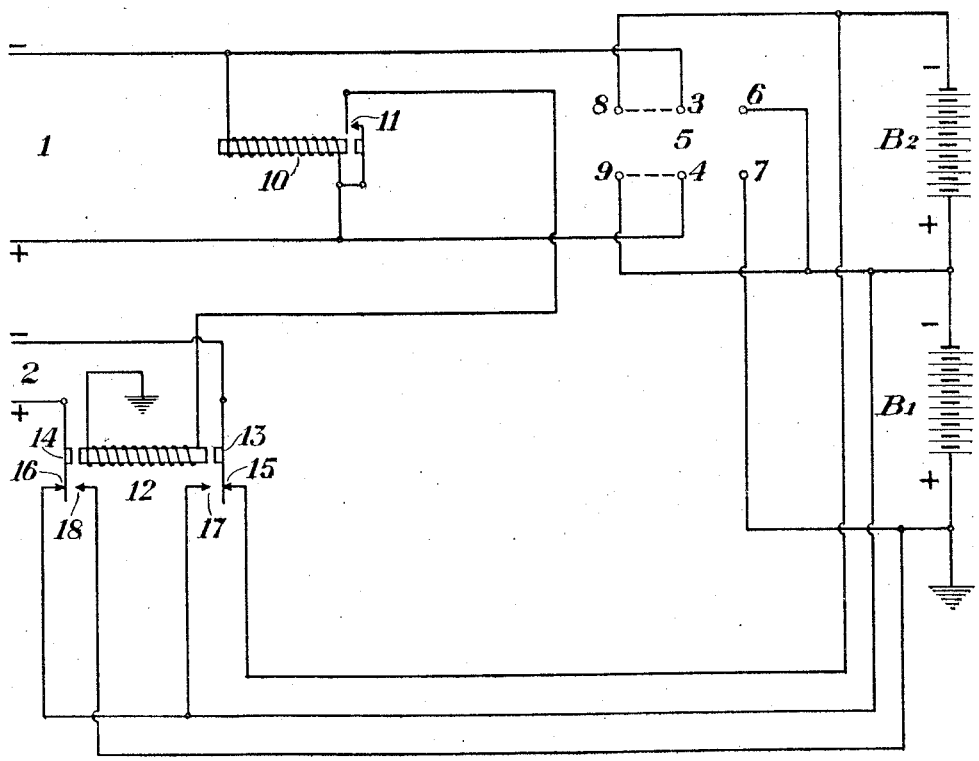

J. F. TOOMEY.
AUTOMATIC SWITCHING MEANS.
APPLICATION FILED SEPT. 13, 1916.

1,270,465.

Patented June 25, 1918.
2 SHEETS—SHEET 1.

Inventor:
J. F. Toomey
per Thomas D. Lockwood
Attorney.

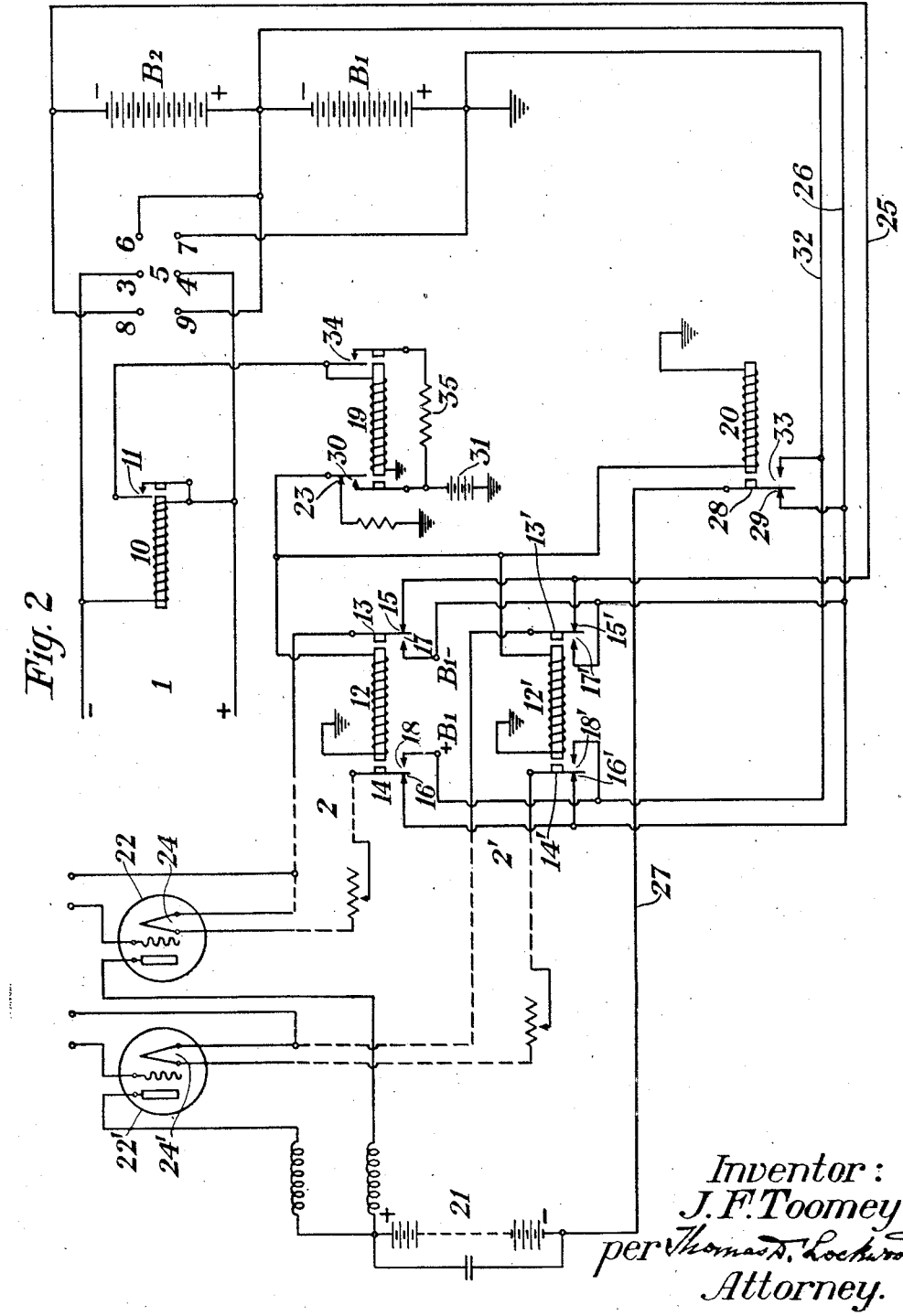

UNITED STATES PATENT OFFICE.

JOHN F. TOOMEY, OF NEW YORK, N. Y., ASSIGNOR TO AMERICAN TELEPHONE AND TELEGRAPH COMPANY, A CORPORATION OF NEW YORK.

AUTOMATIC SWITCHING MEANS.

1,270,465.                      Specification of Letters Patent.      Patented June 25, 1918.

Application filed September 13, 1916.   Serial No. 119,938.

*To all whom it may concern:*

Be it known that I, JOHN F. TOOMEY, residing at New York city, in the county of New York and State of New York, have invented certain Improvements in Automatic Switching Means, of which the following is a specification.

This invention relates to automatic switching arrangements for battery charging systems and more particularly it relates to the combination with two batteries, an energy consuming load, and a source of charging energy, of means for automatically throwing and maintaining the load on one battery while the other is being charged.

My invention is best understood by reference to the accompanying drawings, in which Figure 1 is a diagram of the arrangements of my invention adapted for use with any form of load, while Fig. 2 is a modification of the arrangements shown in Fig. 1 which is adapted for use with a load consisting of a plurality of vacuum tube repeaters in telephone circuits.

Referring to Fig. 1, line 1 connects with the charging generator (not shown) while line 2 connects with the load (not shown). The two conductors of line 1 terminate in switch-points 3 and 4 of double-pole double-throw switch 5. Switch-points 6 and 7 are connected to the negative and positive terminals respectively of battery $B_1$, while switch-points 8 and 9 are connected to the negative and positive terminals respectively of battery $B_2$. The negative terminal of battery $B_1$ is directly connected to the positive terminal of battery $B_2$ as shown, and the positive terminal of battery $B_1$ is grounded.

Connected across line 1 is the winding of a relay 10 adapted to be energized by the generator voltage thereby closing contact 11 and maintaining said contact closed as long as the generator or battery voltage is impressed on line 1. The winding of a relay 12 has one terminal permanently connected to ground and thereby to the positive terminal of battery $B_1$ while the other terminal of said winding is connected through contact 11 to the positive side of line 1. Relay 12 has two armatures 13 and 14 connected to the negative and positive sides respectively of line 2. When relay 12 is not energized armatures 13 and 14 are connected through contacts 15 and 16 to the negative and positive terminals respectively of battery $B_2$, and battery $B_2$ is thereby connected across the load. When relay 12 is energized armatures 13 and 14 are connected through contacts 17 and 18 respectively to the negative and positive terminals of battery $B_1$ respectively, and battery $B_1$ is thereby connected across the load. It will be thus seen that the function of relay 12 is to select either of the two batteries $B_1$ and $B_2$ to supply the load.

The operation of the arrangement shown in Fig. 1 will now be explained. There are three possible positions of switch 5, namely, open, closed to connect switch-points 3 and 4 with switch-points 6 and 7 respectively, and closed to connect switch-points 3 and 4 with switch-points 8 and 9 respectively. Considering the open position first, relay 12 is not energized, since there is no closed circuit including its winding. Contact points 15 and 16 are consequently connected to armatures 13 and 14 respectively and battery $B_2$ is connected across the load. Considering next the case when switch-points 3 and 4 are connected to switch-points 6 and 7 respectively, the circuit including the winding of relay 12 may be traced from ground through said winding, thence through contact 11 to the positive side of line 1 and thence through switch-points 4 and 7 to ground. Winding 12 is therefore shortcircuited, battery $B_2$ is connected across the load and battery $B_1$ is connected across line 1 for charging. Considering finally the third case when the switch is thrown to connect switch-points 3 and 4 with switch-points 8 and 9 respectively, thus connecting battery $B_2$ across the line for charging, the circuit through the winding of relay 12 may be traced from ground through said winding to the positive side of line 1 through contact 11 and thence through switch-points 4 and 9 to the negative terminal of battery $B_1$ and through said battery back to ground. It is thus seen that the winding of relay 12 is connected across battery $B_1$; it is thereby energized and battery $B_1$ is connected across the load through contacts 17 and 18.

It will be thus seen that the arrangement described above contemplates employing battery $B_2$ as the main battery which is normally connected across the load except when being charged while battery $B_1$ is essentially an auxiliary battery which serves to supply the load only when the main battery is being charged.

Fig. 2 is a diagram illustrating the switching arrangements of my invention when the batteries $B_1$ and $B_2$ are employed to supply energy for heating the filaments of a plurality of vacuum tube repeaters. The circuit connections of vacuum tube repeaters necessitate modifications of the arrangements illustrated in Fig. 1 as will be more fully explained hereinafter. Referring to Fig. 2, the switching arrangement there shown is the same as that illustrated in Fig. 1 except for the addition of relays 19 and 20 and their associated circuits and of relay 12' which is similar and equal to relay 12 and in multiple therewith. The relays 12 and 12' serve to connect separate filaments to battery $B_1$ or $B_2$ and said relays might be combined into a single relay except for the practical difficulty of designing a relay to carry the required current through its contact points. Relay 19 controls the operation of relays 12 and 12' while relay 20 connects the negative terminal of a battery 21, common to the output circuits of vacuum tube repeaters 22 and 22', to the positive terminals of batteries $B_2$ and $B_1$ alternatively. The positive terminal of battery 21, which furnishes the energy for repeater operation, is connected to the positive electrodes of the vacuum tube repeaters in multiple.

The operation of the system of Fig. 2 will now be described. As the initial condition assume that switch 5 is open and that the charging generator (not shown) is disconnected from line 1. Contact 11 of relay 10 is open, since no potential is impressed by line 1 on the winding of said relay. The circuit including the winding of relay 19 is open and therefore both terminals of the windings of relays 12 and 12' are connected to ground, one terminal of each relay through a permanent ground connection and the two other terminals through contact 23 of relay 19. A similar condition exists as regards relay 20 since the windings of relays 12, 12' and 20 are in multiple and are similarly controlled by relay 19. Filaments 24 and 24' of repeaters 22 and 22' respectively are connected in parallel across battery $B_2$, filament 24 being connected through line 2, armatures 13 and 14 and contacts 15 and 16 of relay 12, and conductors 25 and 26, while filament 24' is connected through a similar circuit comprising line 2', armatures 13' and 14' and contacts 15' and 16' of relay 12', and conductors 25 and 26. The negative terminal of battery 21 is connected to the positive terminal of battery $B_2$ through conductor 27, armature 28 and contact 29 of relay 20, and conductor 26. The negative terminal of battery 21 is therefore connected to the same point as the positive terminals of filaments 24 and 24' to which energy is furnished by battery $B_2$.

Next assume that with switch 5 still open the charging generator is connected to line 1 thereby impressing the potential of said generator across the winding of relay 10. Relay 10 is thereby energized and contact 11 closed through which one terminal of winding 19 is connected to the positive side of line 1. Since, however, in accordance with the arrangements adapted for use with the switching arrangements of my invention, neither terminal of the charging generator is grounded, the closing of contact 11 establishes no circuit through the winding of relay 19 and the positions of the various relays, with the exception of relay 10 are unchanged by impressing the generator potential on line 1.

Next assume that, with the charging generator connected to line 1, switch 5 is closed to connect switch-points 3 and 4 with switch-points 6 and 7 respectively thus connecting battery $B_1$ to line 1 for charging. The positive side of line 1 is thereby connected to ground through switch-points 4 and 7 and the winding of relay 19 is therefore short-circuited. None of the relays are operated, therefore, by the above described operation and the filament heating current continues to be supplied by battery $B_2$ while battery $B_1$ is being charged.

Assume, now, that it is desired to charge battery $B_2$ and to this end switch 5 is reversed connecting switch-points 3 and 4 with switch-points 8 and 9 respectively, thereby connecting battery $B_2$ across line 1 for charging. This manual operation connects the positive side of line 1 to ground through switch-points 4 and 9 and battery $B_1$. Battery $B_1$ is therefore in closed circuit with the winding of relay 19, said relay is energized and through the consequent closing of contact 30 of said relay, battery 31 is connected in circuit with the windings of relays 12, 12' and 20. As a consequence relays 12, 12' and 20 are energized with the following results: Contacts 15 and 16 of relay 12 are opened and contacts 17 and 18 are closed thereby connecting filament 24 of repeater 22 to battery $B_1$ through line 2 contacts 17 and 18 and conductors 26 and 32. Similarly filament 24' of repeater 22' is connected to battery $B_1$ through line 2', contacts 17' and 18' and conductors 26 and 32. The operation of relay 20 opens contact 29 and closes contact 33 thereby disconnecting the negative terminal of battery 21 from the positive terminal of battery $B_2$ and connecting it to the positive terminal of battery $B_1$. The closing of contact 34 of relay 19 connects battery 31 through resistance 35 in series with the winding of said relay, thereby locking said relay in its energized position. Consequently if switch 5 is now opened, relay 19 remains operated by virtue of the connection of its winding to battery 31, and relays 12, 12' and 20 remain energized. Clearly also relay 19 remains operated when the charging generator is disconnected from line 1, releasing relay 10 and opening its contact 11.

As a final example of the operation of the switching arrangements of my invention assume that with relay 19 locked by battery 31 and the generator connected to line 1, switch 5 is thrown to connect switch-points 3 and 4 with switch-points 6 and 7 respectively thereby connecting battery $B_1$ across line 1 for charging. The connecting of switch-points 4 and 7 grounds the positive side of line 1 directly and hence grounds the winding of relay 19 through contact 11 of relay 10. The winding of relay 19 is thereby shortcircuited, contact 30 is open, contact 23 is closed, and relays 12, 12' and 20 are de-energized. The original circuit connections are thereby restored, battery $B_2$ supplies the heating current to filaments 24 and 24' and the negative terminal of battery 21 is connected to the positive terminal of battery $B_1$.

It will thus be seen that the function of relay 20 is to maintain the negative terminal of battery 21 at the same potential as the positive terminals of filaments 24 and 24' of repeaters 22 and 22', a condition necessitated by the circuit connections and arrangements of vacuum tube repeaters. It will further be seen that batteries $B_1$ and $B_2$ are alternative rather than main and auxiliary batteries, and that by virtue of the locking arrangements associated with relay 19, either battery when once connected to the repeater filaments, continues to furnish energy to said filaments until the operation of switch 5 connects said battery across line 1 for charging. If the connection between battery 31 and the winding of relay 19 were removed by the removal of contact 34 the load would normally be connected to battery $B_2$ and said battery would furnish heating energy at all times except when actually being charged.

The advantage consequent upon the locking arrangement resides in the fact that neither battery is thrown on the load immediately after its charging when its potential exceeds that of the other battery by an appreciable amount.

What is claimed is:

1. The combination of a source of charging energy, two batteries serially connected and a plurality of vacuum tube repeaters, each repeater comprising a filament, and a positive electrode, a source of direct current energy whose positive terminal is connected to said positive electrodes in multiple, relays individual to said repeaters for connecting said filaments in multiple with either of said batteries when the other of said batteries is being charged, and a relay common to said plurality of repeaters for connecting the negative terminal of said source of direct current energy to that battery terminal to which the positive terminals of said filaments are connected.

2. The combination of a source of charging energy, two batteries serially connected, a plurality of vacuum tube repeaters, each repeater comprising a filament and a positive electrode, a source of direct current energy connected to said main electrodes in multiple, relays individual to said repeaters automatically operating when one of said batteries is connected to said source of charging energy to connect the plurality of filaments to the other of said batteries, and a relay, common to said plurality of repeaters, operating simultaneously with said other relays to connect said source of direct current energy with the filament heating battery.

3. The combination of a source of charging energy, two batteries serially connected, switching means to connect said source with either of said batteries, an energy consuming device adapted to be supplied by either of said batteries, a relay for connecting said energy consuming device to said batteries alternatively, and a second relay for controlling the operation of said first named relay.

4. A system of distribution comprising a pair of storage batteries, a charging means therefor, a load, switching means to connect one of said batteries with said charging means, a second switching means to connect the other battery to the load, and a relay whereby the operation of said second switching means may be controlled by said first switching means.

5. A system of distribution comprising a pair of storage batteries, a charging circuit therefor, a generator capable of connection to said charging circuit, a load, switching means for connecting one of said batteries to said charging circuit, a second switching means to connect the other battery to the load, and a relay adapted to be energized by said generator or by either of said batteries whereby the operation of said second switching means may be controlled by said first switching means.

6. A system of distribution comprising a pair of storage batteries, a charging means therefor, a load, switching means for connecting either battery to the charging means, and a relay capable of being energized by said charging means or by either of said batteries and adapted to control the connection of the load with said batteries whereby the said load will be connected with that battery which is not connected with the charging means.

7. A system of distribution comprising a pair of storage batteries, a charging means therefor, a load, switching means for connecting either battery to the charging means, a relay controlling the connection of said batteries to the load, a circuit for said relay closed when said switching means is operated to connect one of said batteries to the charging means, a locking circuit for said relay to hold said relay energized when said switching means is operated to disconnect both batteries from the charging means, and means to deënergize said relay when the switching means is operated to connect the other of said batteries to the charging means.

8. In a system of distribution, the combination of two sources serially connected and a load, said load comprising a vacuum tube structure including a heated filament and a plate, an auxiliary source to produce a potential difference between the filament and the plate, switching means for connecting either of said first sources to the filament to heat the same and a separate switching means controlled by said first switching means to connect a pole of the auxiliary source to one side of the filament.

9. In a system of distribution, the combination of two sources serially connected and a load, said load comprising a vacuum tube structure including a heated filament and a plate, an auxiliary source to produce a potential difference between the filament and the plate, leads from similar poles of each of the first mentioned sources, switching means to connect one or the other of said leads to one side of the filament to heat the same, and switching means controlled by said first switching means to connect a pole of the auxiliary source to the lead connected with the filament.

10. In a system of distribution, the combination of two sources serially connected and a load, said load comprising a plurality of vacuum tubes each including a heated filament and a plate, an auxiliary source to produce a potential difference between the filaments and the plates, a plurality of switching devices for connecting either of said first sources to the filaments to heat the same and a switching means controlled by said first switching means for connecting a pole of the auxiliary battery to the filament through said switching devices.

In testimony whereof, I have signed my name to this specification in the presence of one subscribing witness, this sixth day of September, 1916.

JOHN F. TOOMEY.

Witness:
RALPH W. WOLF.